(12) United States Patent
Van Der Vliet et al.

(10) Patent No.: US 7,343,070 B2
(45) Date of Patent: Mar. 11, 2008

(54) OPTICAL SPLITTER WITH TAPERED MULTIMODE INTERFERENCE WAVEGUIDE

(75) Inventors: Frederick Marcel Van Der Vliet, Pasadena, CA (US); Harm Van Weerden, Enschede (NL)

(73) Assignee: Gemfire Europe Limited, Livingston (GB)

( * ) Notice: Subject to any disclaimer, the term of this patent is extended or adjusted under 35 U.S.C. 154(b) by 0 days.

(21) Appl. No.: 10/521,086

(22) PCT Filed: Jul. 11, 2003

(86) PCT No.: PCT/GB03/03028

§ 371 (c)(1),
(2), (4) Date: Jan. 9, 2006

(87) PCT Pub. No.: WO2004/008207

PCT Pub. Date: Jan. 22, 2004

(65) Prior Publication Data

US 2006/0115200 A1    Jun. 1, 2006

(30) Foreign Application Priority Data

Jul. 13, 2002   (GB) ................. 0216319.4

(51) Int. Cl.
*G02B 6/42* (2006.01)
(52) U.S. Cl. ............... 385/43; 385/44; 385/45; 385/46; 385/48; 385/50; 385/28; 385/51
(58) Field of Classification Search ........... 385/43–46, 385/28, 50–51, 31, 48
See application file for complete search history.

(56) References Cited

U.S. PATENT DOCUMENTS 5,629,992 A    5/1997   Amersfoort et al.

(Continued)

FOREIGN PATENT DOCUMENTS

DE         101 21 007 A1    11/2002

(Continued)

OTHER PUBLICATIONS

Lorenzo et al: "Improved Self-Imaging Characteristics in 1×N Multimode Couplers", IEEE Proceedings: Optoelectronics, Institution of Electrical Engineers, Stevenage, GB, vol. 145, No. 1, Feb. 1998, pp. 65-69, ISSN: 1350-2433 figure 1.

(Continued)

*Primary Examiner*—Brian Healy
*Assistant Examiner*—Guy G Anderson
(74) *Attorney, Agent, or Firm*—Warren S. Wolfeld; Haynes Beffel & Wolfeld LLP

(57) ABSTRACT

A 1×2 splitter design having low loss is described. The splitter has a non-adiabatic tapered waveguide (22) connected between a substantially single-mode input waveguide (20) and two output waveguides (24, 26). The non-adiabatic tapered waveguide widens in width towards the output waveguide, and merges substantially continuously with the input waveguide in a direction parallel to the optical axis of the input waveguide. This keeps radiation mode generation to a minimum which, in turn, keeps insertion loss low. In the described embodiment, the non-adiabatic taper shape is based on a perturbed cosine function. The 1×2 splitter can be cascaded with other such splitters in order to build a 1×2N splitter design.

16 Claims, 4 Drawing Sheets

U.S. PATENT DOCUMENTS

| | | | |
|---|---|---|---|
| 5,745,619 A * | 4/1998 | Li et al. ................. | 385/48 |
| 6,069,990 A | 5/2000 | Okawa et al. | |
| 6,169,838 B1 | 1/2001 | He et al. | |
| 6,222,956 B1 | 4/2001 | Akiba et al. | |
| 6,222,966 B1 * | 4/2001 | Khan et al. ............. | 385/45 |
| 6,236,784 B1 * | 5/2001 | Ido ........................ | 385/45 |
| 6,463,188 B1 * | 10/2002 | Takahashi et al. ....... | 385/14 |
| 6,515,776 B1 | 2/2003 | Naganuma | |
| 6,526,203 B1 | 2/2003 | Gonzalez et al. | |
| 6,549,688 B2 | 4/2003 | Bazylenko | |
| 6,563,988 B2 | 5/2003 | McGreer | |
| 6,625,187 B1 | 9/2003 | Ikoma et al. | |
| 6,633,703 B2 * | 10/2003 | Katayama ................ | 385/37 |
| 6,643,432 B2 * | 11/2003 | Bouda .................... | 385/43 |
| 6,728,438 B2 * | 4/2004 | Kwang Bae ............. | 385/28 |
| 6,768,842 B2 * | 7/2004 | Bulthuis et al. .......... | 385/37 |
| 6,888,985 B2 * | 5/2005 | Hosoi ..................... | 385/37 |
| 6,892,008 B2 * | 5/2005 | Singh et al. ............. | 385/49 |
| 2002/0114572 A1 | 8/2002 | Bouda | |
| 2002/0159703 A1 * | 10/2002 | McGreer ................ | 385/43 |
| 2005/0207705 A1 * | 9/2005 | Laurent-Lund ........ | 385/45 |

FOREIGN PATENT DOCUMENTS

| | | |
|---|---|---|
| EP | 0 444 817 B1 | 4/1997 |
| EP | 0 811 860 A2 | 12/1997 |
| EP | 0 881 512 | 12/1998 |
| GB | 2 368 131 A | 4/2002 |
| JP | 09297228 A | 11/1997 |
| JP | 2001-13336 | 1/2001 |
| WO | WO 02/101435 A1 | 12/2002 |
| WO | WO 02/103423 | 12/2002 |

OTHER PUBLICATIONS

Keh-Yi Lee et al: "New Type of 1×3 MMI Optical Power Dividers with Reverse Taper Section", Journal of Optical Communications, 24 (2003) 1, 31-34, XP009019114, figure 1.

Krueger et al: "Design and Realisation of a Novel Polymer-based Singlemode Integrated-Optical Beam Splitter", MOEMS & Miniaturized Systems, Santa Clara, CA USA, Sep. 18-20, 2000 vol. 4178, pp. 77-87, XP-002257830, Proceedings of SPIE—The International Society for Optical Engr., 2000, SPIE-Int. Soc. Opt. Eng. USA ISSN: 0277-786X.

Zirngibl: "Efficient 1×16 Optical Power Splitter Based on InP", Electronics Letters Jun. 18, 1992, vol. 28 No. 13, pp. 1212-1213, XP000301390, ISSN: 0013-5194, figure 1.

Marz, Reinhard, "Integrated Optics, Design and Modeling," International Standard Book No. 0-89006-668-X, 1995.

* cited by examiner

OPTICAL SPLITTER WITH TAPERED MULTIMODE INTERFERENCE WAVEGUIDE

The present invention relates to a branching or "splitter" waveguide structure. In particular, the invention relates to a 1×2 splitter having low loss.

1×2 splitters in the form of adiabatic Y-junction or Y-branch waveguide structures are well known and used in planar lightguide circuits (PLCs). FIG. 1 shows a conventional y-branch splitter in which a single-mode input waveguide 1 branches into two single mode output waveguide 2,3 at a Y-junction 4. Where the branching ratio is 1:1 we call this a symmetric Y-branch. Such Y-branch structures can be arranged in a cascaded arrangement to form a 1×$2^N$ splitter, as illustrated in FIG. 3 (which shows a 1×16 splitter). A problem with the Y-branches is that it is very difficult in practice to fabricate a perfect point 5 in the Y-junction, where the two output waveguides 2,3 meet. In practice, instead of a perfect point, a flat edge or "blunt" 6 is formed, as shown in FIG. 2. In fact, in order to meet required manufacturing tolerances in order to make a reproducable device, the splitter will commonly be purposely designed to have the blunt taper shape 4 shown in FIG. 2. A disadvantage of this blunt is that radiation modes are excited at the blunt, leading to insertion loss. In a 1×$2^N$ splitter such as shown in FIG. 2 the insertion loss at each Y-branch may add up to an unacceptably high total insertion loss (IL) in the splitter device. Moreover, the generation of radiation modes results in reduced Insertion Loss uniformity (ILU) i.e. the variation of the IL as a function of wavelength, across the operational wavelength range of the device.

Another type of splitter is based on a multi-mode interferometer (MMI) waveguide. FIG. 4 shows a 1×2 splitter formed by coupling an MMI 10 between a single mode input waveguide 1 and two single-mode output waveguides 2,3. This non-adiabatic device works on the principle that the MMI converts the single-mode input signal into a double-peaked signal before the branches of the splitter start, so that the two peaks enter the two output waveguides respectively. Such MMI-based splitters have higher fabrication tolerances than the Y-branch splitters of FIG. 1. However, they have the disadvantage that the abrupt junction between the input waveguide and the input edge 12 of the MMI 10 gives rise to radiation modes, and thus insertion loss.

A low radiation loss asymmetric splitter is proposed in U.S. Pat. No. 6,236,784. This shows an MMI-based splitter design in which one or both sides of the MMI have a curved shape along the signal propagation direction. However, this structure still used an abrupt transition between the input waveguide and the MMI in order to generate the higher order modes which create the desired double-peaked field at the output edge of the MMI, and so the problem of radiation loss at this abrupt transition is still present.

It is an aim of the present invention to avoid or minimise one or more of the foregoing disadvantages.

According to the present invention there is provided a splitter comprising: a substantially single-mode input waveguide; at least two output waveguides; and a non-adiabatic tapered waveguide optically coupled between the input waveguide and the output waveguides, said waveguides being formed on a substrate; wherein the non-adiabatic tapered waveguide, along at least a portion of its length, widens in width towards the output waveguides, in a plane parallel to the substrate, and the non-adiabatic tapered waveguide merges substantially continuously with the input waveguide in a direction parallel to the optical axis of the input waveguide.

The splitter of the invention has the advantage that there is no abrupt transition between the input waveguide and the multi-mode region, and so generation of radiation modes is minimized, thereby reducing insertion loss and improving the insertion loss uniformity. Moreover, the splitter can in general be designed to be shorter in length (along the propagation direction) than an adiabatic Y-branch splitter, as the non-adiabatic tapered waveguide is itself shorter than an adiabatic tapered waveguide would be. This has obvious cost advantages in terms of PLC chip real estate.

Preferably, the non-adiabatic waveguide tapers gradually so as to excite a second order mode therein.

The non-adiabatic tapered waveguide preferably tapers substantially symmetrically with respect to an extension of the optical axis of the input waveguide. The non-adiabatic tapered waveguide may have opposing tapered sides each having a taper shape based on a perturbed cosine curve.

Optionally, at least one of the output waveguides may have an adiabatically tapered end which is connected to the non-adiabatic tapered waveguide and which widens in width, or which narrows in width, towards the non-adiabatic tapered waveguide.

Preferred embodiments of the invention will now be described by way of example only and with reference to the accompanying drawings in which.

Figure 5:
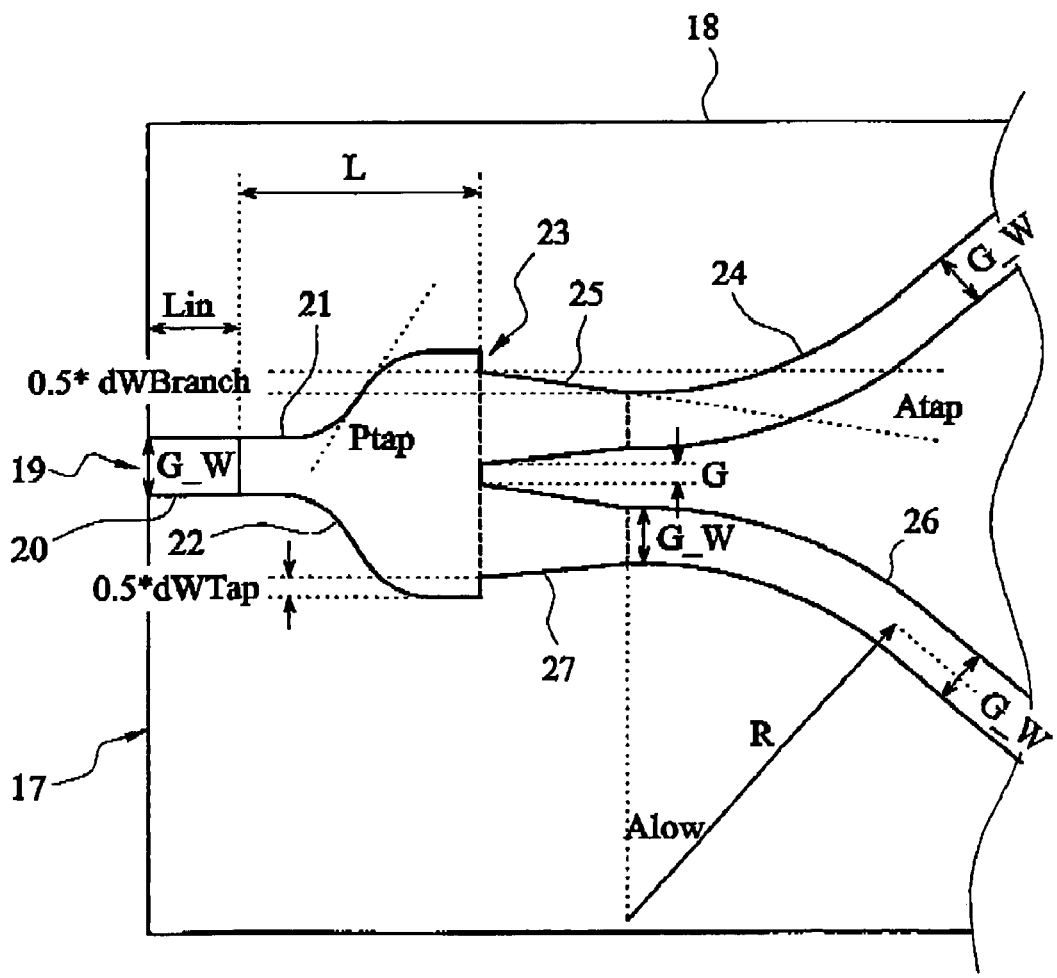
FIG. 5 is a plan view of a 1×2 splitter according to an embodiment of the present invention.
Figure 6:
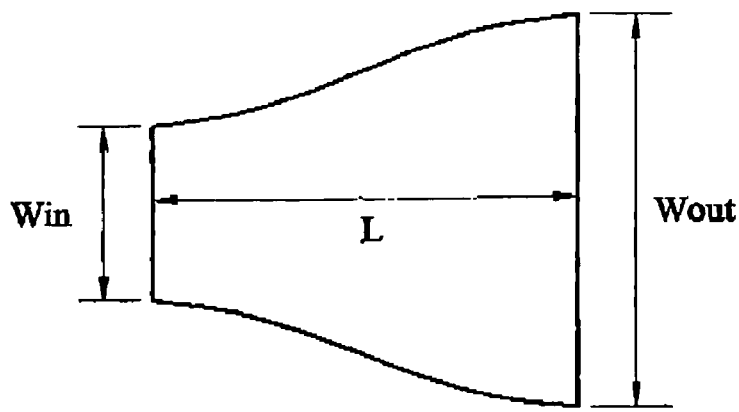
FIG. 6 is a plan schematic view of a non-adiabatic tapered waveguide having its shape defined by a perturbed cosine function.
Figure 7A:
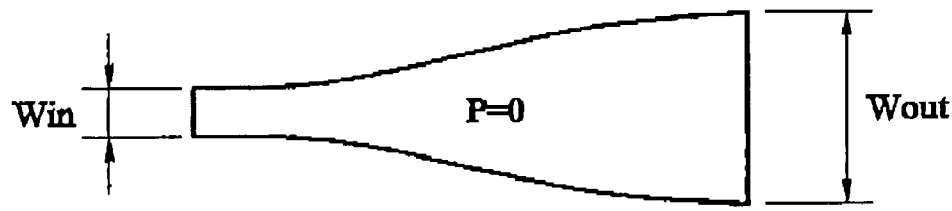
Figure 7B:
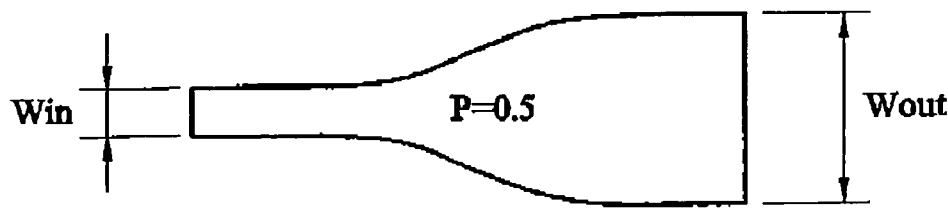
Figure 7C:
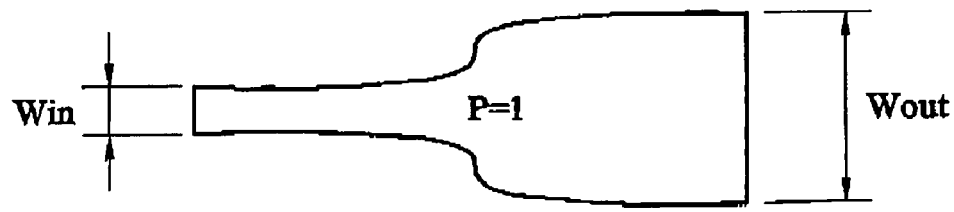
Figure 8:
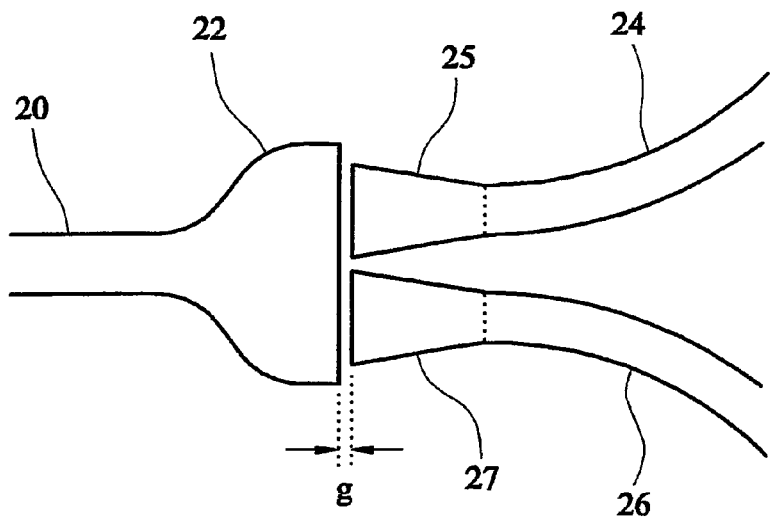
Figure 9:
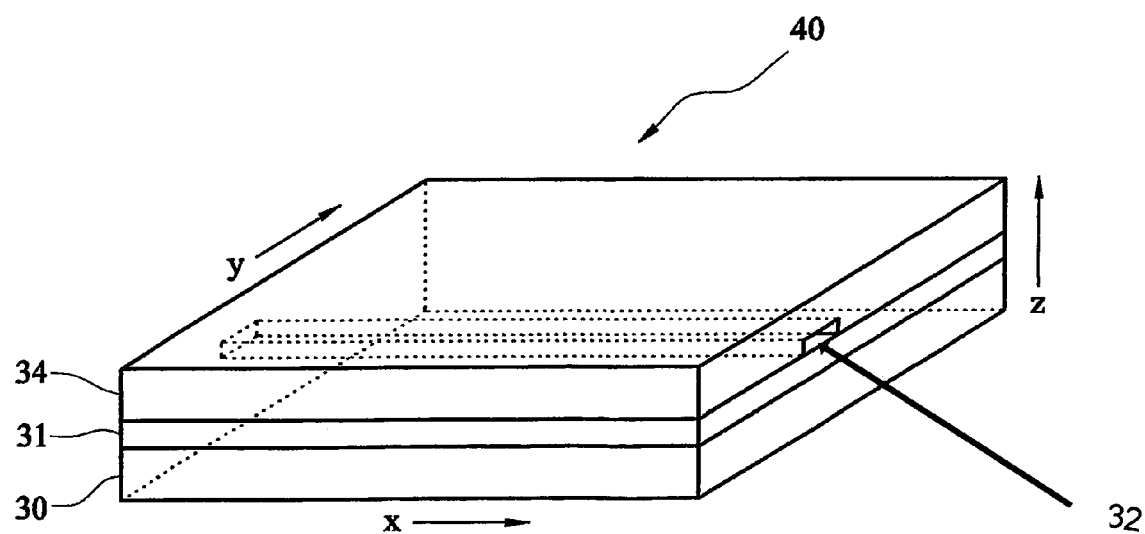

FIG. 7(a) to (c) illustrate the modified shape of the taper of FIG. 6, obtained when three different shape factors, p, are used to perturb the cosine shape;

FIG. 8 is a schematic plan view of a modified version of the splitter of FIG. 5; and FIG. 9 is a perspective schematic view of a waveguide formed in a PLC chip.

FIG. 5 illustrates a 1×2 splitter formed in a Planar Lightguide Circuit (PLC) chip 18. The splitter comprises a single-mode input waveguide 20 coupled to two output waveguides 24,26 by a non-adiabatic tapered waveguide 22. The output waveguides each consist of a single mode waveguide having an adiabatically tapered end portion 25,27 coupled to the wide (output) end 23 of the non-adiabatic tapered waveguide 22, such that the output waveguides widen towards the non-adiabatic tapered waveguide, in plan view of the splitter as shown in FIG. 5. As can be seen in FIG. 5, the taper shape is such that the width of the waveguide 22 gradually increases, in a generally non-linear manner, from the input end 21 coupled to the input waveguide 20, to the output end 23 coupled to the two output waveguides. Where this splitter is the first optical circuit feature on the PLC chip 18, as shown in FIG. 5, an input end 19 of the input waveguide 20 will abut the input face 17 of the PLC chip. The taper shape of the non-adiabatic tapered waveguide 22 is generally designed to cause continuous mode conversion, of the fundamental mode to the second order mode, of an input signal entering the input end 21 of the tapered waveguide from the input waveguide 20, along the length L of the taper 22, to form a double-peaked mode field at the output end 23 of the taper 22. In the embodiment of FIG. 5, the shape of the non-adiabatic tapered waveguide is based on a perturbed cosine function, and is defined by the following equations (with reference to FIG. 6);

$$w(t) = w_{in} + \frac{w_{out} - w_{in}}{2}[1 - \cos(2\pi t)]$$

$$z(t) = L\left[t + \frac{p}{2\pi}\sin(2\pi t)\right]$$

$$t = [0 \ldots 1]$$

where L is the length of the non-adiabatic tapered waveguide 22;

w(t) is the width along the propagation direction;

z(t) is the length along the propagation direction;

$w_{in}$ and $w_{out}$ are the widths of the input and output ends 21,23 respectively of the tapered waveguide 22; and p is a shape factor, which preferably has a value between 0 and 1, most preferably between 0.6 and 0.9, and which basically controls the slope in the middle (z=0.5 L) of the taper (values of p greater than 1 are also possible, though less preferred).

In the splitter of FIG. 5, the width $w_{in}$ of the input waveguide (and hence also of the input end 21 of the non-adiabatic taper 22) is G_W, which in this embodiment is equal to the width of the singe mode portion of each of the two output waveguides 24,26 (in other possible embodiments the width of the input and output waveguides can be different, if desired for any reason). Other variables in the splitter design of FIG. 5 include:

G, the width of the gap or "blunt" formed between the adjacent edges of the two output waveguides 24,26 at the output end 23 of the non-adiabatic tapered waveguide 22;

R, the radius of curvature of each output waveguide;

dWBranch, the additional width of the tapered end 25,27 of each output waveguide, as compared with the width G-W of the single mode portions of these output waveguides;

dWTap, the additional width of the output end 23 of the non-adiabatic taper, as compared with the total width of the two adiabatically tapered output waveguide ends and the gap width G;

Lin, the length of the input waveguide.

For a given $w_{in}$ and $w_{out}$, the free parameters in the taper shape are L and p. For different p values, the taper shape changes. This is illustrated in FIGS. 6(a) to (c) which show the taper shape for p=0, p=0.5 and p=1 respectively. L and p are chosen so that the phase difference between the zero and second order modes, at the output end 23 of the non-adiabatic taper, is equal to an odd multiple of π (i.e. π, 3π, 5π . . . etc). This gives a straight phase front which will reduce coupling losses to the output waveguides 24,26. π it is the preferred value as this will give the shortest taper length. Beam Propagation Mode (BPM) simulations are used to choose the optimum values for the variables in the splitter design (including to calculate the required value of p and L in order that the afore-mentioned phase condition is met by the non-adiabatic taper 22), so as to obtain a splitter design giving optimum performance in terms of the required specifications of the end device, in particular the insertion loss of the splitter.

A significant feature of the perturbed cosine tapered waveguide shape is that at the beginning 21 of the taper, where the taper 22 merges into the output end of the single mode input waveguide 20, the taper angle is kept low by virtue of the generally cosine curve shape of the taper at the beginning. This keeps radiation losses to a minimum. (For the avoidance of doubt, the taper angle is defined as the angle of the tapered sides of the waveguide relative to the propagation direction in the waveguide. In the illustrated embodiments, where the waveguides have a generally symmetrical structure, the propagation direction is along the axis of the waveguides.) The taper angle gradually increases towards the output waveguides until after the perturbation introduced by the factor p.

Figure 1:
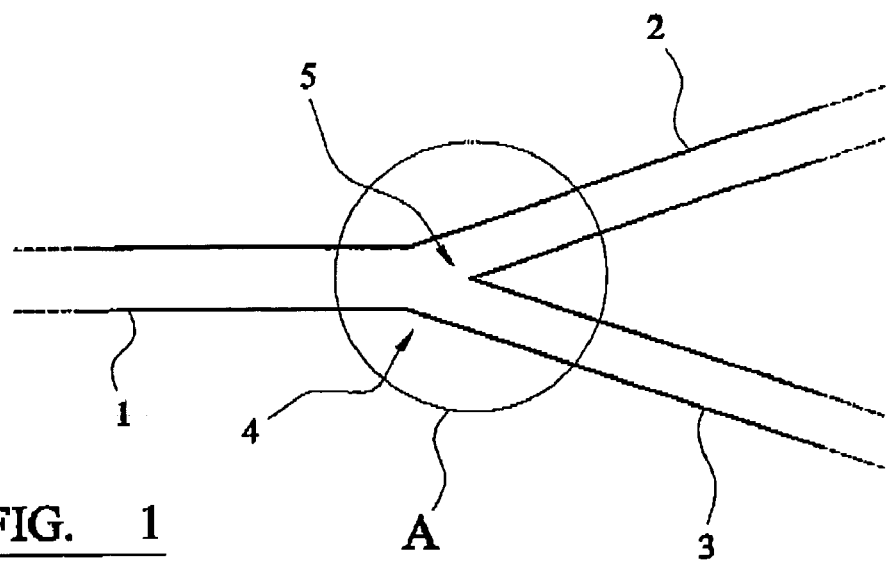
FIG. 1 is a plan view of a prior art Y-branch 1×2 splitter.
Figure 2:
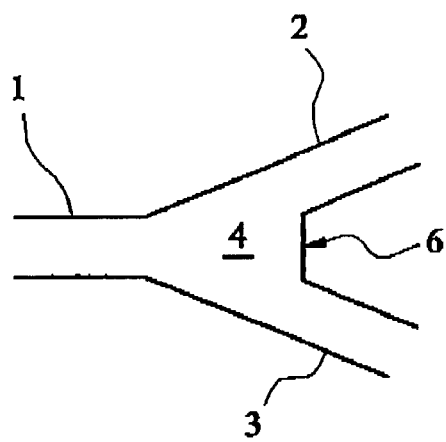
FIG. 2 is a detailed view of the ringed portion A of the Y-branch splitter of FIG. 1, showing a blunt formed in the fabrication process.

Another advantage of the invention, compared with conventional splitter designs like that of FIG. 2, is that the width of the gap or blunt, G, between the output waveguides where they join to the cosine taper, can be made larger than the width of the blunt 6 in the conventional splitter design of FIG. 2. In such conventional splitter designs the highest intensity is at the middle of the taper 4. (This is not the case in the present invention in which the output from the non-adiabatic taper is double-peaked.) Therefore, in the conventional design of FIG. 2 one would like to have the gap (blunt) between the output waveguides, at the output of the taper 4, as small as possible to reduce the losses. The desired smallness of this gap can lead to designs that are less tolerant to production tolerances e.g. it is easier to make and to reproduce a gap of 2 micron compared to a gap of 1 micron. For a conventional splitter design like that of FIG. 2 the optimum gap is 0, giving the splitter design of FIG. 1. For the non-adiabatic cosine taper splitter of the present invention the optimum gap G is not equal to 0 and can be designed to be a number which can easily be manufactured and reproduced. A follow-on advantage of this is that the inventive splitter will be more tolerant, in terms of wavelength dependent loss (VDL), to process variations.

In known manner the waveguides in the PLC chip 18 are all typically formed as silica "cores" 32 on a silicon substrate 30 (an oxide layer 31 is commonly provided on the substrate prior to depositing the waveguide materials and/or a lower silica cladding layer not shown may be deposited) and are covered in a cladding material 34, using Flame Hydrolysis Deposition (FHD) or Chemical Vapour Deposition (CVD) fabrication processes (together with photolithography and etching steps). FIG. 9 shows one such waveguide formed in a PLC chip 40. However the present invention is equally applicable to waveguide devices formed in other material systems, or having a different waveguide structure e.g. rib waveguides.

Figure 3:
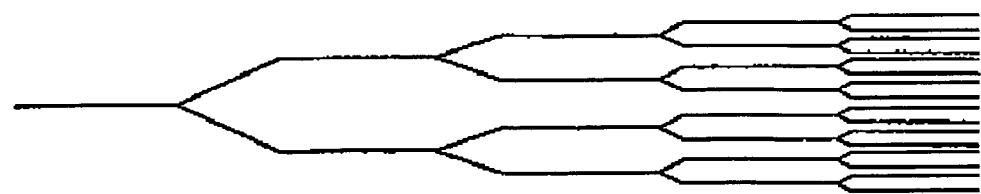
FIG. 3 is a plan schematic view of a 1×$2^N$ splitter, where N=4.
Figure 4:
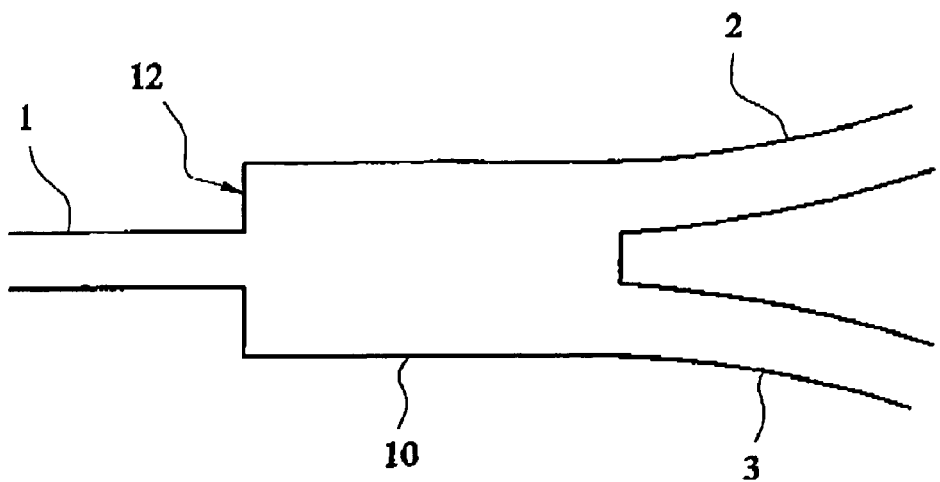
FIG. 4 is a plan view of a prior art 1×2 MMI-based splitter.

It will be appreciated that the splitter design of FIG. 5 can be cascaded with several identical such 1×2 splitters in a similar manner as shown in FIG. 3, in order to obtain a 1×2$^N$ splitter, where N=2,3,4, . . . . The use of the perturbed cosine taper shape in each 1×2 splitter keeps the total insertion loss for the resulting 1×2$^N$ splitter to a minimum.

Modifications to the above-described embodiment are of course possible within the scope of the invention. For example, the single-mode output waveguides may in some cases not be tapered 25,27 where they connect to the perturbed cosine taper 22. Nevertheless, the use of tapers at these ends of the output waveguides is generally preferred. This is because such tapers allow an increase in the overlap of the double-peaked field (combination of zero and second order modes) at the output (i.e. wide) end of the cosine taper 22 with the field of the two output waveguides at the transition point (where the output waveguides join to the cosine taper waveguide 22). The field will change shape with a change in the width of the output waveguides at the-transition point. There will be an optimal width (and gap, G) to obtain a maximum overlap. Adiabatic tapers on the output waveguides are preferred as they minimise any further energy losses.

In another possibility there may be a small gap g (for example, about 1 μm) provided between each output waveguide 24,26 and the output end 23 of the non-adiabatic tapered waveguide 22, as shown in FIG. 8. This is done for process reasons as it is believed to achieve a better definition of the gap G, between the output waveguides (at the wide end of the non-adiabatic tapered waveguide) and so improve the production tolerances.

In the embodiment of FIG. 5 the input waveguide is a single-mode waveguide. In other embodiments the input waveguide may be allowed to be slightly double-moded (bi-modal) as long as no significant signal is effectively carried by the higher order modes (i.e. modes above the fundamental mode). In both cases we consider such a waveguide as being a "substantially single mode" waveguide. The output waveguides are preferably always substantially single-mode, but could be multi-mode if desired for any reason. In another possibility, the input waveguide could be a bi-modal waveguide in which only a first order signal mode propagates, but this is not preferred as it is likely to lead in practice to unpredictable performance of the device (due to any process-related imperfections in the waveguides which may result in undesirable mode conversion to higher order modes).

In another possible modified version of the device of FIG. 5, the tapered ends 25,27 of the output waveguides 24,27 may narrow in width towards the non-adiabatic tapered waveguide 22 instead of widening as shown in FIG. 5. A decreasing width will widen the modal field distribution in the waveguide, giving a similar effect (on the optical signal) as a widening width.

Furthermore, in other possible embodiments the non-adiabatic tapered waveguide 22 need not continue to widen in width along its entire length L until it joins with the output waveguides as in the FIG. 5 embodiment. For example, the non-adiabatic waveguide may, if desired, widen towards the output waveguides along a majority of its length and then may start narrowing in width before it joins the output waveguides. This will however result in the total length of the splitter being longer than in the FIG. 5 embodiment.

Also, in the embodiment of FIG. 5 the output waveguides 24,26 do not have to bend in an arc shape with radius R; other curves are possible.

The invention claimed is:

1. A splitter comprising:
a substantially single-mode input waveguide;
at least two output waveguides; and
a non-adiabatic tapered waveguide optically coupled between the input waveguide and the output waveguides;
said waveguides being formed on a substrate; wherein
the non-adiabatic tapered waveguide, along at least a portion of its length, widens in width towards the output waveguides, in a plane parallel to the substrate,
the non-adiabatic tapered waveguide merges substantially continuously with the input waveguide in a direction parallel to the optical axis of the input waveguide, and
the non-adiabatic tapered waveguide has a shape that forms a double-peaked field at the junction between the tapered waveguide and the output waveguides, each of the peaks entering a respective one of the output waveguides.

2. A splitter according to claim 1, wherein at least an initial portion of the non-adiabatic tapered waveguide proximal to the input waveguide has a taper angle which increases towards the output waveguides.

3. A splitter according to claim 2, wherein the non-adiabatic waveguide tapers gradually so as to excite a second order mode therein.

4. A splitter according to claim 3, wherein the length of the non-adiabatic tapered waveguide, in a direction parallel to the direction of propagation of an optical signal therein, is such that the phase difference between the fundamental and second order modes, at an output end of the non-adiabatic tapered waveguide is equal to Mπ where M1,3,5 . . . .

5. A splitter according to claim 2, wherein the non-adiabatic tapered waveguide tapers symmetrically with respect to the direction of propagation of an optical signal therein.

6. A splitter according to claim 5, wherein the non-adiabatic tapered waveguide has opposing tapered sides each having a taper shape based on a perturbed cosine curve.

7. A splitter according to claim 2, wherein said output waveguides are substantially single mode waveguides.

8. A splitter according to claim 7, wherein at least one of the output waveguides has an adiabatically tapered end which is connected to an output end of the non-adiabatic tapered waveguide and which widens in width towards the non-adiabatic tapered waveguide.

9. A splitter according to claim 2, wherein there is a gap between an output end of the non-adiabatic tapered waveguide and respective ends of the output waveguides optically coupled thereto.

10. A splitter according to claim 1, wherein the non-adiabatic tapered waveguide has a shape in a plane parallel to the substrate that excites a second order mode therein but substantially no mode higher than the second order mode.

11. A splitter according to claim 1, wherein the first and second output waveguides are separated from each other transversely by a blunt,
and wherein the multi-peaked field has a local intensity minimum at the blunt.

12. A splitter according to claim 1, wherein the tapered waveguide has a propagation direction, the tapered waveguide having a non-adiabatic taper in a plane parallel to the substrate, the taper having a curvilinear shape defined by the following equations:

$$w(t) = w_{in} + \frac{w_{out} - w_{in}}{2}[1 - \cos(\pi t)]$$

$$z(t) = L\left[t + \frac{p}{2\pi}\sin(2\pi t)\right]$$

$$t = [0 \ldots 1]$$

where L is the length of the non-adiabatic tapered waveguide,
w(t) is the width of the waveguide along the propagation direction,
z(t) is a position along the propagation direction,
win and wout are the widths of the input and output ends, respectively, of the tapered waveguide, and
p is a shape factor.

13. A substrate supporting:
a tapered waveguide having a propagation direction, the waveguide having a non-adiabatic taper in a plane parallel to the substrate, the taper having a curvilinear shape defined by the following equations:

$$w(t) = w_{in} + \frac{w_{out} - w_{in}}{2}[1 - \cos(\pi t)]$$

$$z(t) = L\left[t + \frac{p}{2\pi}\sin(2\pi t)\right]$$

$$t = [0 \ldots 1]$$

where L is the length of the non-adiabatic tapered waveguide,
w(t) is the width of the waveguide along the propagation direction,
z(t) is a position along the propagation direction,
win and wout are the widths of the input and output ends, respectively, of the tapered waveguide, and
p is a shape factor.

14. Apparatus according to claim 13, wherein p has a value between 0 and 10.

15. Apparatus according to claim 13, wherein p has a value between 0 and 1.

16. Apparatus according to claim 13, wherein p has a value between 0.6 and 0.9.

* * * * *

UNITED STATES PATENT AND TRADEMARK OFFICE
CERTIFICATE OF CORRECTION

PATENT NO. : 7,343,070 B2 Page 1 of 1
APPLICATION NO. : 10/521086
DATED : March 11, 2008
INVENTOR(S) : Frederick M. Van Der Vliet et al.

It is certified that error appears in the above-identified patent and that said Letters Patent is hereby corrected as shown below:

Column 1, lines 21-22, "reproducable" should read -- reproducible --; and
column 1, line 26, "FIG. 2" should read -- FIG. 3 --.

Column 3, line 6, "FIG. 6);" should read -- FIG. 6): --;
column 3, line 9, that portion of the first equation reading "$[1-\cos(2\pi t)]$" should read -- $[1-\cos(\pi t)]$ --;
column 3, line 50, "6(a) to (c)" should read -- 7(a) to (c) --; and
column 3, lines 56-57, "$\pi$ it is" should read -- $\pi$ is --.

Column 4, line 40, "not shown" should read -- (not shown) --.

Claim 4, line 14, "M1,3,5 . . . ." should read -- M=1,3,5, .... --.

Signed and Sealed this

First Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,343,070 B2
APPLICATION NO. : 10/521086
DATED : March 11, 2008
INVENTOR(S) : Frederick M. Van Der Vliet et al.

It is certified that error appears in the above-identified patent and that said Letters Patent is hereby corrected as shown below:

Column 1, lines 21-22, "reproducable" should read -- reproducible --; and
Column 1, line 26, "FIG. 2" should read -- FIG. 3 --.

Column 3, line 6, "FIG. 6);" should read -- FIG. 6): --;
Column 3, line 9, that portion of the first equation reading "[1-cos(2πt)]" should read -- [1-cos(πt)] --;
Column 3, line 50, "6(a) to (c)" should read -- 7(a) to (c) --; and
Column 3, lines 56-57, "π it is" should read -- π is --.

Column 4, line 40, "not shown" should read -- (not shown) --.

Column 6, Claim 4, line 14, "M1,3,5 . . . ." should read -- M=1,3,5, .... --.

This certificate supersedes the Certificate of Correction issued July 1, 2008.

Signed and Sealed this

Twenty-second Day of July, 2008

JON W. DUDAS
*Director of the United States Patent and Trademark Office*